United States Patent Office 3,541,387
Patented Nov. 17, 1970

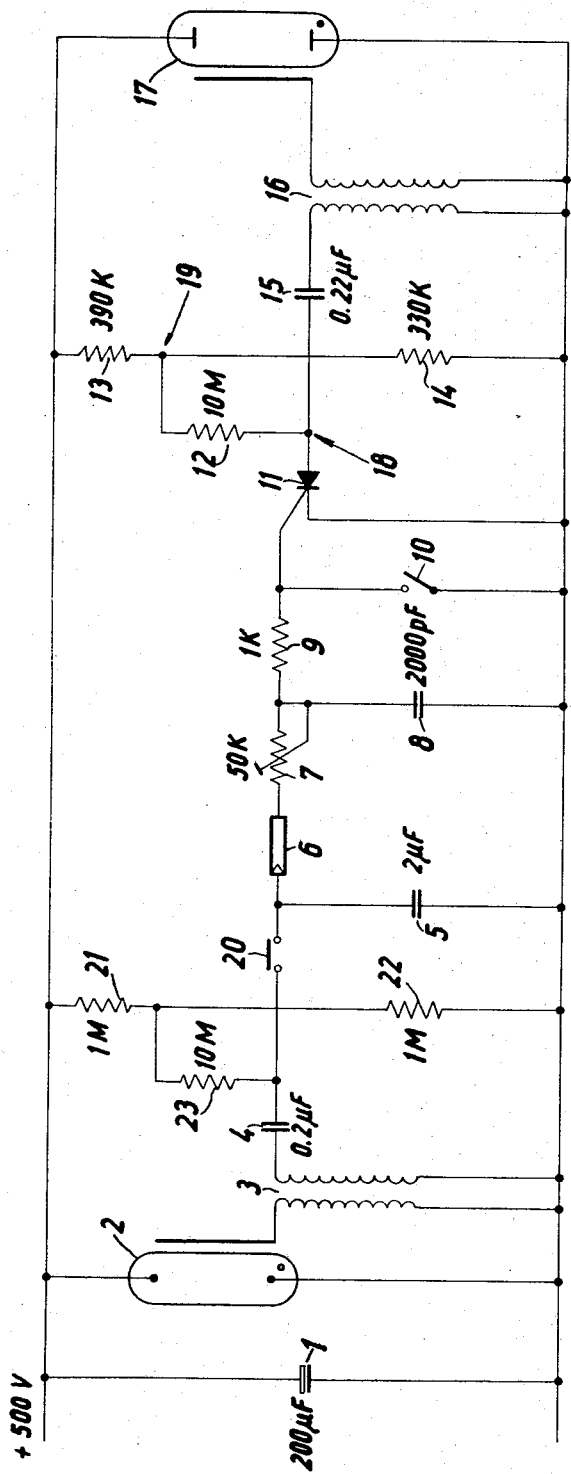

3,541,387
CONTROL SYSTEM FOR TERMINATING THE
DISCHARGE OF A FLASH LAMP
Karl Ackermann, Berlin, Germany, assignor to Robert
Bosch Elektronik Gesellschaft mit beschraenkter Haftung, Berlin, Germany
Filed Jan. 27, 1969, Ser. No. 794,254
Claims priority, application Germany, Apr. 23, 1968,
1,764,204
Int. Cl. G01j 1/32; H05b 39/12, H01j 41/38
U.S. Cl. 315—151          11 Claims

ABSTRACT OF THE DISCLOSURE

An arrangement for controlling the flash duration in photographic cameras. A light-sensitive element within the apparatus responds to light originating from the source for flash bulbs and reflected by the object or scene to be photographed. The flash bulb is ignited by an ignition circuit which also generates the operating voltage for the light-sensitive device. Through the application of a discharge tube which has a considerably lower internal resistance, when ignited, than the flash bulb, the latter becomes extinguished when the light reflected by the object or scene and impinging upon the light-sensitive device, is of a predetermined magnitude.

BACKGROUND OF THE INVENTION

The present invention resides in an electronic flash apparatus for photographic applications which includes a light meter fed from a DC operating voltage supply. The electronic control circuitry containing the light meter extinguishes the flash bulb used in conjunction with the flash apparatus, as soon as the scene to be photographed has reflected a predetermined amount of light onto the light-sensitive element of the light meter.

Heretofore, an electronic flash apparatus has been available for the purpose of omitting the requirement to set the diaphragm of a photographic camera prior to each exposure because of the different distances between the flash apparatus and the scene to be photographed. The flash apparatus serves under these conditions the purpose of illuminating the scene to be photographed. With such electronic flash apparatus, the flash bulb becomes automatically extinguished when the scene to be photographed is sufficiently illuminated. In this manner, the object or scene being photographed is correctly illuminated in view of the condition that the duration of the flash is controlled through the amount of light reflected by the scene upon a light sensitive element.

The light meter includes, for this purpose, an integrating arrangement which integrates the electrical current derived from the light-sensitive element and actuates in response thereto, a control arrangement, as soon as the integrated current attains a predetermined value. The conventional means for integration is in the form of a capacitor which integrates the current derived from the light-sensitive element. The capacitor becomes charged, and when the voltage across the capacitor attains a predetermined value, the control arrangement becomes actuated and the flash bulb becomes thereby extinguished. It is known in the art that for the purpose of extinguishing the flash bulb, a discharge tube is used in parallel with the flash bulb. The discharge tube has a considerably lower internal resistance than the flash bulb when it is ignited. The discharge tube becomes thus ignited through the control arrangement or circuitry when the capacitor has attained a predeteremined voltage level. The lower internal resistance of the ignited discharge tube causes the discharge of the storage capacitor which provides electrical energy for the flash bulb, and as a result the flash bulb becomes extinguished.

An electronic arrangement provided with such a control circuit, however, has the disadvantage that the photographic process or operation can be interfered with through the prevailing ambient light, as well as through the photographic flash resulting from another camera in the neighboring vicinity. The ambient light causes current to be generated through the light-sensitive element before actuation of the flash apparatus, and this current is applied to the capacitor which performs its integrating function. As a result, the capacitor possesses unpredictable initial voltage prior to initiation of the flash. In view of this condition, the time interval during which the predetermined voltage across the capacitor is attained, is no longer well defined. Furthermore, a remote flash from another apparatus in the vicinity, can actuate the control arrangement or circuitry of the flash apparatus under consideration, at an undesired instant of time. The result of such action is that the storage capacitor becomes thereby discharged.

In order to avoid interference through the ambient light, it has been previously proposed to omit the integrating capacitor and to provide a single and sole photoresistor of predetermined characteristics. With such an arrangement, however, interference resulting from remote flashes can still not be avoided.

It is also known in the art, to connect the light meter into the circuit first at the beginning of the flash, through a switch or shutter mechanism. With such design, disturbances or interferences can be avoided from either the ambient light or remote flashes. Such design, however, requires rather careful and meticulous mechanical construction which is considerably complex and thereby costly to manufacture. At the same time, such mechanism and design does not operate reliably.

In accordance with the present invention, on the other hand, an arrangement is provided in which the ambient light as well as remote flashes are taken into account through a very simple and reliable manner. The present invention provides that the operating DC voltage is realized through the ignition of the flash bulb by an ignition current from an ignition circuit for the flash bulb. The arrangement in accordance with the present invention is based on electrical structure rather than mechanical parts, and thereby the control circuitry is principally switched on only during the flash. In this manner, interferences from remote flashes and ambient light cannot be incurred.

The flash bulb of an electronic flash apparatus becomes ignited through the application of an ignition capacitor operating in conjunction with an ignition transformer. The ignition capacitor is connected to the primary winding of the ignition transformer, and when a synchronizing shutter cable becomes switchingly actuated, the ignition capacitor discharges and thereby produces a high voltage ignition pulse in the secondary winding of the ignition transformer. This high voltage pulse is applied to the flash bulb.

In carrying out the concept of the present invention, the primary winding of the ignition transformer can form a closed series circuit with the ignition capacitor and with a charging capacitor, when igniting the flash bulb. The voltage across the charging capacitor results from charging of the ignition capacitor and serves as the DC operating voltage for the light meter.

When the electronic flash apparatus is switched on, one electrode of the ignition capacitor is connected to a voltage divider associated with the flash bulb. The other electrode of the ignition capacitor leads to ground potential, by way of the primary winding of the ignition transformer. The ignition capacitor becomes thus charged to a corresponding voltage.

When the synchronizing shutter cable is actuated so that it forms a closed circuit through it, the charging capacitor becomes switched to the ignition capacitor. One electrode of this charging capacitor is connected to ground potential. With this arrangement the primary winding of the ignition transformer forms a closed series circuit with the ignition capacitor and with the charging capacitor. The ignition capacitor, thereby, transfers a portion of its charge to the charging capacitor, by way of the primary winding of the ignition transformer. When, in accordance with the further provision of the present invention, the capacitance of the charging capacitor is large compared to that of the ignition capacitor, the largest proportion of the charge of the ignition capacitor becomes transferred to the charging capacitor. As a result, the equalizing current flows from the charged ignition capacitor to the uncharged charging capacitor by way of the primary winding of the ignition transformer. Through this current flow through the ignition transformer, the flash bulb becomes ignited.

The voltage resulting across the charging capacitor through rapid charging of the latter to its maximum value, remains first constant near this maximum level, and forms the DC operating voltage for the light meter.

In a further embodiment of the present invention, the light meter can contain a series circuit to which the DC operating voltage is applied and which includes a light sensitive element in the form of a photoresistor, an adjustable charging resistor, and an integrating capacitor.

The adjustable charging resistor must be set in accordance with the sensitivity or speed of the film being used. This setting remains as the only setting to be carried out by the photographer. The setting can remain for as long as the same film material is used. After the flash bulb becomes ignited, the current produced by the photoresistor becomes integrated by the capacitor. This current through the photoresistor is a function of the brightness or illuminating intensity and the distance of the flash bulb from the scene or object to be illuminated. The integrating capacitor attains a predetermined voltage after a predetermined time interval suitable for illuminating the film.

In accordance with a further embodiment of the present invention, the voltage of the integrating capacitor can be applied, through a protective resistor, to the cathode-control electrode path of a controlled silicon diode or thyristor. This controlled silicon diode or silicon rectifier ignites a discharge tube when controlled so that it is in the conducting state. This discharge tube lies in parallel with the flash bulb, in the conventional manner. The internal resistance of the discharge tube, when ignited, has a considerably lower value than the internal resistance of a flash bulb.

Through the large current due to the ignition of the discharge tube by the thyristor, the storage capacitor which feeds the flash bulb becomes discarged at an earlier instant of time than if it were to be discharged only through the flash bulb itself. As a result, the flash bulb becomes extinguished at the correct instant of time determined by the illumination required for the specific film being used in the camera.

Another specific feature of the present invention resides in the manner in which the thyristor and the discharge tube are interconnected.

SUMMARY OF THE INVENTION

An electronic flash arrangement for photographic cameras in which the flash bulb becomes extinguished after ignition when light reflected from the object to be photographed has attained a predetermined magnitude. A light measuring circuit responds to light originating from the flash bulb and reflected by the object to be photographed. The flash bulb is ignited through an ignition circuit which also generates a DC operating voltage for the light measuring device. Once the flash bulb becomes ignited, light is reflected by the object and impinges upon the light measuring device. When the reflected light impinging on the light measuring device has thus attained a predetermined level, the flash bulb becomes extinguished, and as a result the correct amount of illumination is applied for the photographic operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

An electrical schematic diagram of the electronic flash arrangement showing the operating components and their interconnections, in accordance with the present invention.

DESCRIPTION OF THE PREFERRED EMBODIMENTS

Referring to the drawing, a storage capacitor 1 of approximately 200 μf. becomes charged to approximately 500 volts during several seconds after the electronic flash apparatus is switched on through electrical elements, not shown. This storage capacitor 1 provides the electrical energy for a flash bulb 2.

When the electronic flash circuit, of the present invention, is switched on, one electrode or terminal of the capacitor 4 leads to the junction of resistors 21 and 22, by way of resistor 23. Resistors 21 and 22 form a voltage divider connected across the 500 volt supply which is also applied across the flash bulb 2. Thus, the voltage divider composed of resistors 21 and 22 is connected in parallel with the terminals of the flash bulb 2. Whereas one terminal of the resistor 21 is connected to the +500 volt potential line, the resistor 22 terminates at ground potential. The capacitor 4 functions in the circuit as an ignition capacitor. The primary winding of an ignition transformer 3 has one terminal connected to the opposite terminal of the ignition capacitor 4, so that this other or opposite terminal of the ignition transformer 4 leads to ground potential through the primary winding of the ignition transformer 3. The ignition transformer serves further to ignite the flash bulb, and as a result of connecting the primary winding of the transformer 3 to the capacitor 4, in this manner, the ignition capacitor becomes charged to a voltage established by the voltage divider consisting of resistors 21 and 22.

The switch 20 shown in the drawing represents the shutter synchronizing and actuating cable of the camera. This cable is between the flash apparatus and the photographic camera. When this synchronizing cable 20 is actuated, a short circuit is established across the terminals denoted in the drawing as associated with the switch 20, and a series circuit is formed through the primary winding of the ignition transformer 3, the ignition capacitor 4, and a charging capacitor 5. As a result of this closed series circuit, the ignition capacitor 4 transfers charge to the charging capacitor 5, so that in the final state both capacitors have the identical voltage applied across them. The current flowing from the ignition capacitor 4 to the charging capacitor 5 for the purpose of equalizing their charge voltages, flows also through the primary winding of the ignition transformer 3. As a result of this current flow through the primary winding, a high voltage pulse is generated in the secondary winding of the transformer, and the flash bulb 2 becomes ignited.

Assuming for example, that the ignition capacitor 4 has a capacitance of 0.2 μf. and that the capacitor 5 has a capacitance of 2 μf., then the voltage prevailing across the capacitor 5, when the circuit is switched on, is 1/11 of 250 volts, or approximately 23 volts. This voltage which remains first constant forms the operating DC voltage for a light meter which contains the series circuit comprised of a photoresistor 6, a variable or adjustable resistor 7, and an integrating capacitor 8.

The photoresistor is a light-sensitive element and varies its resistance as a function of the illumination intensity. For larger illuminating intensities the resistance decreases and permits a larger current to flow from the charging capacitor 5 to the capacitor 8. The latter integrates the individual current elements to the extent that the voltage on the capacitor 8 thereby increases. When illumination of larger magnitudes is applied to the photoresistor 6, the capacitor 8 attains more rapidly a predetermined voltage level, than it does when the illumination intensity is of lower magnitudes. The adjustable resistor 7 must be set, as already indicated, in accordance with the sensitivity of the film material being used.

A control silicon diode 11 in the form of a thyristor receives its anode potential by way of a large resistor 12 which may be of the order of approximately 10 megohms. This resistor 12 is connected to the tap or junction 19 of a voltage divider comprised of resistors 13 and 14. This voltage divider is connected across the voltage supply of 500 volts for the flash bulb 2. The control or starting electrode of the thyristor is connected with the integrating capacitor 8, by way of a protective resistor 9. The cathode of this thyristor, on the other hand, is connected to ground potential. The anode-cathode path of the thyristor is not conducting when the voltage between the control electrode and the cathode is below a predetermined value. As long as the thyristor is non-conducting, the ignition capacitor 15 for a discharge tube 17, also remains charged. The ignition capacitor 15 is connected to the junction 18 leading to the anode of the thyristor, and leading also to the tap 19 of the voltage divider of resistors 13 and 14, by way of the large resistor 12. The other terminal of the capacitor 15 leads to ground potential by way of the primary winding of an ignition transformer 16.

When ignition of the flash bulb 2 is initiated through the short circuiting cable switch 20, the voltage across the charging capacitor 5 becomes available as a DC operating voltage. The integrating capacitor 8 thus acquires a voltage sufficient to fire the thyristor 11, as a result of the current flow from the charging capacitor 5 and through the photoresistor 6. When the thyristor is thus fired and the anode-cathode path of the thyristor is conducting, the ignition capacitor 15 for the discharge tube 17, discharges through the thyristor. As a result of this discharge, a current pulse is realized in the primary winding of the ignition transformer 16. The discharge tube 17 becomes ignited through the secondary winding of this transformer 16. This discharge tube 17, when ignited, has a considerably lower resistance than the flash bulb 2, and therefore the latter is extinguished when the discharge tube becomes ignited. As a result of such action, the object or scene to be photographed is no longer illuminated. The discharge tube 17 is mounted within the interior of the electronic flash apparatus, and is covered against the exterior environment.

After the flash bulb 2 is extinguished through the discharge tube 17, a small residual voltage prevails across the storage capacitor 1 and also at the tap or junction 19 of the voltage divider comprised of resistors 13 and 14. In order that the voltage at the anode of the thyristor 11, and thereby the junction 18, acquires a small value for the purpose of again turning off the thyristor, a large ohmic value is selected for the resistor 12. Thus, this resistor is selected so that it has a value of the order of 10 megohms. The integrating capacitor 8 charges, after control of the thyristor 11 has been exercised, through the protective resistor 9 and the cathode-control electrode path towards ground potential.

Through closing of a switch 10, the electronic control arrangement for automatic extinguishing of the flash bulb 2, may be made inoperative.

The component values indicated in the circuit diagram of the drawing, have been designated only for the purpose of illustrating the basis for the selection of the components. It is quite possible to provide, in cases, different values for these components.

It will be understood that each of the elements described above, or two or more together, may also find a useful application in other types of constructions differing from the types described above.

While the invention has been illustrated and described as embodied in electronic flash apparatus for cameras, it is not intended to be limited to the details shown, since various modifications and structural changes may be made without departing in any way from the spirit of the present invention.

What is claimed as new and desired to be protected by Letters Patent is set forth in the appended claims:

I claim:

1. An electronic flash arrangement for photographic cameras comprising, in combination, flash bulb means; ignition means connected to said flash bulb means for igniting said flash bulb means; light measuring means for responding to light from said flash bulb means and reflected by the object to be photographed; said ignition means connected to the light measuring means in a way as to deliver a D.C. operating voltage for the light measuring means, so that said D.C. operating voltage prevails only after the ignition of the flash bulb means; said flash bulb means becoming extinguished after ignition when the light reflected by said object and impinging upon said light measuring means is of a predetermined magnitude.

2. The electronic flash arrangement for photographic cameras as defined in claim 1 wherein said ignition means comprises an ignition transformer connected to said flash bulb means; and ignition capacitor connected to said ignition transformer means; and a charging capacitor connected in series with said ignition capacitor and said ignition transformer means when said flash bulb means is ignited, the voltage across the charging capacitor resulting from charging said ignition capacitor and being said operating voltage for operating said light measuring means.

3. The electronic flash arrangement for photographic cameras as defined in claim 2 wherein the capacitance of said charging capacitor is large compared to the capacitance of said ignition capacitor.

4. The electronic flash arrangement for photographic cameras as defined in claim 3 wherein the capacitance of said charging capacitor is ten times as large as the capacitance of said ignition capacitor.

5. The electronic flash arrangement for photographic cameras as defined in claim 1 wherein said light measuring means includes the series connection of a light sensitive element, an adjustable resistor, and an integrating capacitor.

6. The electronic flash arrangement for photographic cameras as defined in claim 5 wherein said light sensitive element is a photoresistor.

7. The electronic flash arrangement for photographic cameras as defined in claim 5 including controlled silicon rectifying means with cathode-control electrode path connected to said integrating capacitor means; discharge tube means parallel with said flash bulb means and ignited by said controlled rectifier means, the internal resistance of said discharge tube means being substantially smaller when ignited than the resistance of said flash bulb means.

8. The electronic flash arrangement for photographic cameras as defined in claim 7 including protective resistor means between said integrating capacitor means and said controlled electrode-cathode path of said controlled rectifier means.

9. The electronic flash arrangement for photographic cameras as defined in claim 7 including an ignition transformer connected to said discharge tube means for igniting the same; ignition capacitor means connected between said ignition transformer means and said controlled rectifier means; and voltage divider means connected to said ignition capacitor means and said controlled rectifier means.

10. The electronic flash arrangement for photographic cameras as defined in claim 9 including resistor means connected between said voltage divider means and the junction of said ignition capacitor means and said controlled rectifier means.

11. The electronic flash arrangement for photographic cameras as defined in claim 10 wherein said resistor means has a resistance value substantially of the order of megohms.

References Cited

UNITED STATES PATENTS

| | | | |
|---|---|---|---|
| 3,033,988 | 5/1962 | Edgerton | 315—151 X |
| 3,340,426 | 9/1967 | Elliott | 315—151 |
| 3,350,603 | 10/1967 | Erickson | 315—151 |
| 3,350,604 | 10/1967 | Erickson | 315—151 |

JAMES W. LAWRENCE, Primary Examiner

C. R. CAMPBELL, Assistant Examiner

U.S. Cl. X.R.

250—205, 206; 315—156, 159